Nov. 18, 1947.   W. A. POCHEK   2,431,299
AUTOMATIC PLUG VALVE LUBRICATOR
Filed July 22, 1944
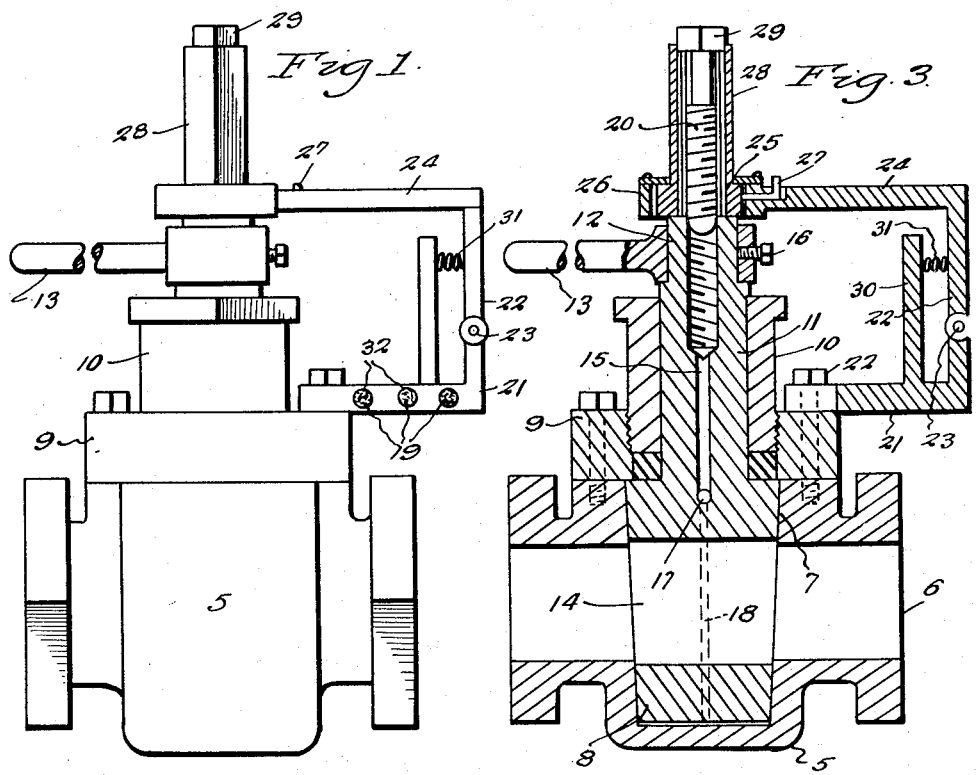
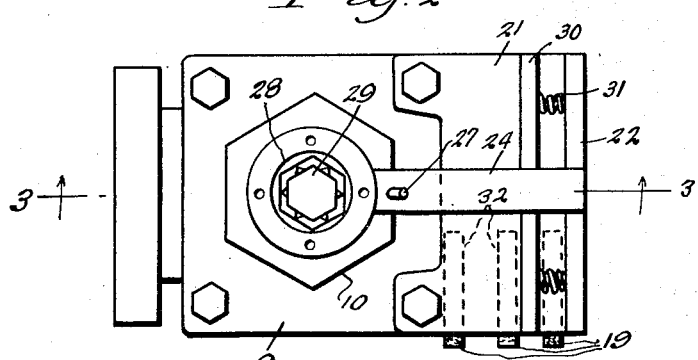
Inventor
William A. Pochek
By Clarence A. O'Brien
and Harvey B. Jacobson
Attorneys Patented Nov. 18, 1947

2,431,299

UNITED STATES PATENT OFFICE 2,431,299

AUTOMATIC PLUG VALVE LUBRICATOR

William A. Pochek, East St. Louis, Ill.

Application July 22, 1944, Serial No. 546,110

2 Claims. (Cl. 251—93)

This invention relates to rotary plug valves of that type wherein a lubricant feed screw is movable axially of the stem of the rotary valve plug for forcing a lubricant between the coacting surfaces of the valve plug and its casing, thereby insuring free turning of the valve plug and minimizing wear of the coacting surfaces of the valve plug and the casing.

More particularly, the present invention contemplates the provision of means for positively causing adjustment of the lubricant feed screw each time the rotary valve plug is opened and closed, thereby positively insuring a proper supply of lubricant between the coacting surfaces of the valve plug and its casing through the mere use of the valve and without relying upon the user of the valve to adjust the lubricant feed screw independently of the operation of the valve.

A further object of the present invention is to provide an automatic lubricant feed screw actuating device for turn plug valves, which is comparatively simple and durable in construction, efficient in operation, and capable of being readily installed upon existing lubricating valves.

Still another object of the present invention is to provide a feed screw actuating device of the above kind that makes simple and efficient provision for facilitating the insertion of a new stick of lubricating material in the stem of the rotary valve plug as required from time to time.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a side elevational view of a turn plug valve equipped with a lubricant feed screw actuating device embodying the present invention.

Figure 2 is a top plan view thereof.

Figure 3 is a central vertical section taken substantially on line 3—3 of Figure 2.

Referring in detail to the drawings, 5 indicates the casing of a rotary plug valve and 6 the fluid passage through said casing. The casing is further provided with a tapered bore 7 that intersects the passage 6 intermediate the ends of the latter, and rotatably fitted in this bore 7 is a tapered rotary valve plug 8. The valve casing has a bonnet 9 provided with a packing gland 10 upwardly through which extends the stem 11 of the valve plug 8. The stem 11 has a reduced upper end portion 12 on which is fitted and secured the socketed end of an operating handle 13 for the valve plug. The valve plug has a transverse port 14 adapted to be aligned with the passage 6 of the casing when open and to be disposed transversely of said passage when closed. Also, the stem 11 of the valve plug is provided with an axial passage 15 that communicates with the lower end of an axial threaded bore 16 provided in the upper end of the stem 11, and that communicates at its lower end with a transverse passage 17 provided in the upper end of the plug 6 and leading to the periphery of the latter. At one side, the plug 8 has a longitudinal groove 18 with one end of which the outlet end of passage 17 communicates. The bore 16 is adapted for reception of a stick or cartridge of lubricating material 19, and threaded in the upper end of bore 16 is a lubricant feed screw 20. By adjusting the screw 20 inwardly with respect to the bore 16, the lubricant is forced through the passages 15 and 17 into the groove 18 so as to flow between the coacting surfaces of the bore 7 and plug 8. In this way, the coacting surfaces are kept in a properly lubricated condition to insure easy movement of the valve plug and to minimize undue wear of the coacting surfaces. Thus far described, the construction is generally old and well known in the art, it being the ordinary practice to rely upon the user of the valve to adjust the feed screw 20 from time to time and at sufficient intervals to always keep a proper supply of lubricant between the surfaces of the bore 7 and valve plug 8.

In actual practice, it has been found that adjustment of screw 20 at proper intervals has been neglected, as has also the insertion of a new stick of lubricant when required. The result is that the valve plug becomes difficult to turn and considerable wear takes place between the coacting surfaces of the valve plug and the casing. In order to positively prevent this undesirable occurrence, I provide an attachment whereby the screw 20 is adjusted automatically each time the valve plug 8 is opened and closed by actuation of the handle 13. As shown, the attachment includes an angle bracket 21 rigidly bolted at one end to the bonnet 9, as at 22', and consisting of one leaf of a hinge whose other leaf 22 is pivoted thereto, as at 23. Fixed by welding, or the like, to the upper end of the leaf 22 is the outer end of the handle 24 of a ratchet wrench of the reversible type. Such wrenches are old and well known in the wrench art and include a ratchet ring 25 rotatably mounted in the head 26 of the handle 24, means being provided, as at 27, to selectively set pawls of the handle 24 for driving the ratchet ring 25 in either direction. Rigid with and projecting upwardly from the ratchet ring 25 is an elongated wrench socket 28 of the "box" type. When the screw 20 is initially threaded a slight distance in the upper end of bore 16, its head 29 is disposed in the upper end of the socket 28, as shown clearly in Figure 3. It will thus be apparent that the device may permit free turning of ratchet ring 25, socket 28 and screw 20 with the stem 11 and handle 13 and relative to handle 24 and head 26 of the wrench when the plug 8 is turned to the open position of Figure 3. On the other hand, when the plug 8 is rotated in the opposite direction, the ratchet ring 25 may be restrained against turning relative to the handle and head of the wrench with the stem 11, thereby holding the socket 28 and screw 20 against turning. This relative turning of stem 11 relative to screw 20 causes the latter to thread inwardly of the bore 16 so as to automatically feed the lubricant from said bore into passage 15 and ultimately through passage 17 into groove 18. This cycle of operation is repeated each time the valve is opened and closed so as to positively insure feeding of lubricant to the surfaces of the valve plug and the casing bore 7. When the screw 20 has been fed completely into the bore 16, its head 29 will have moved to the lower end portion of socket 28, and by reversing the action of the pawls of the wrench, subsequent operations of the valve may be utilized to cause ultimate threading of the screw 20 out of the bore 16. When this has been done, the wrench may be swung with the hinge leaf 22 upwardly and outwardly to the dotted line position of Figure 3 so that a new stick of lubricant may be inserted in the bore 16 of stem 11. The parts may then be swung back to the position of Figure 3 and the screw 20 may be manually started or threaded partially into the bore 16 to condition the device for use again.

Rigid with and rising from the hinge leaf 21 inwardly of the leaf 22 is a post 30 which carries springs 31 arranged to be engaged by the leaf 22 and slightly compressed when the wrench is swung to the operative position of Figure 3 with the screw 20 partially threaded into the bore 16. These springs maintain a tension on the wrench so as to insure effective engagement of the socket 28 with the head 29 of screw 20. Also, when the screw 20 is threaded entirely out of the bore 16, the springs 31 will act to initially partially swing the wrench and leaf 22 toward the upwardly and outwardly swung inoperative position. If desired, the hinge leaf 21 may be provided with a plurality of transverse sockets 32 for reception of a plurality of the sticks of lubricant 19. This provides a convenient means of storing the sticks of lubricant in position for ready access and use.

From the foregoing description, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim is:

1. In combination with a rotary plug valve including a casing and a rotary plug fitted in the casing and provided with a stem having an actuating handle, said stem having a threaded bore for reception of a stick of lubricant and provided with passages leading from said bore to the periphery of the valve plug, and a feed screw for the lubricant removably threaded into said bore, actuating means for said feed screw including a ratchet wrench mounted upon the valve casing and having a ratchet ring provided with an elongated wrench socket engageable over the feed screw and with the head of the latter, said ratchet wrench including means for reversing the direction of drive of its ratchet ring and the socket whereby the feed screw may be selectively caused to automatically thread into said bore by opening movements of the valve plug or out of said bore by closing movements of said valve plug, the means for mounting the ratchet wrench upon the valve casing including a hinge having an angular leaf bolted to the valve casing and an upstanding leaf to which the wrench is rigidly secured so that the wrench may be swung with the second named leaf upwardly and outwardly upon disengagement of the feed screw from the bore of the stem of the valve plug to facilitate insertion of a new stick of lubricant in said bore.

2. In combination with a rotary plug valve including a casing and a rotary plug fitted in the casing and provided with a stem having an actuating handle, said stem having a threaded bore for reception of a stick of lubricant and provided with passages leading from said bore to the periphery of the valve plug, and a feed screw for the lubricant removably threaded into said bore, actuating means for said feed screw including a ratchet wrench mounted upon the valve casing and having a ratchet ring provided with an elongated wrench socket engageable over the feed screw and with the head of the latter, said ratchet wrench including means for reversing the direction of drive of its ratchet ring and the socket whereby the feed screw may be selectively caused to automatically thread into said bore by opening movements of the valve plug or out of said bore by closing movements of said valve plug, the means for mounting the ratchet wrench upon the valve casing including a hinge having an angular leaf bolted to the valve casing and an upstanding leaf to which the wrench is rigidly secured so that the wrench may be swung with the second named leaf upwardly and outwardly upon disengagement of the feed screw from the bore of the stem of the valve plug to facilitate insertion of a new stick of lubricant in said bore, and yieldable means acting to initiate upward and outward swinging movement of the wrench upon disengagement of the feed screw from the bore.

WILLIAM A. POCHEK.

REFERENCES CITED

The following references are of record in the file of this patent:

UNITED STATES PATENTS

| Number | Name | Date |
| --- | --- | --- |
| 745,886 | Muskett | Dec. 1, 1903 |
| 2,057,343 | Pierce | Oct. 13, 1936 |
| 2,323,421 | Reed | July 6, 1943 |